Aug. 24, 1937.     C. L. TEEL     2,090,906
TRAP NEST
Filed March 21, 1936      2 Sheets-Sheet 1

Inventor
C. L. Teel
By Clarence A. O'Brien and
Hyman Berman
Attorneys

Aug. 24, 1937.　　　　C. L. TEEL　　　　2,090,906
TRAP NEST
Filed March 21, 1936　　　2 Sheets-Sheet 2

Inventor
C. L. Teel

By Clarence A. O'Brien and
Hyman Berman
Attorneys

Patented Aug. 24, 1937

2,090,906

UNITED STATES PATENT OFFICE 2,090,906

TRAP NEST

Clement L. Teel, Mentone, Ind.

Application March 21, 1936, Serial No. 70,145

4 Claims. (Cl. 119—47)

This invention relates to a novel and structurally improved trap nest specifically classifiable with that group of structures characterized by an internal tiltable nest and complemental egg-collecting and retrieving means.

Generally stated, the improved adaptation embodies a box containing a rockable internal nest for individual use wherein the box itself is made with a view toward providing for unimpeded air circulation and proper ventilation instrumental in accomplishing more satisfactory results.

Specifically, novelty resides in an arrangement embodying a unique coordination of accessories cooperable with the receiver and the tiltable nest to accomplish the desired retardation results and to promote safe cushioning properties designed to guard against needless breakage of eggs.

My primary aim is to generally improve upon similar trap nest constructions by providing an arrangement affording proper ventilating facilities to facilitate egg cooling, and to otherwise orderly arrange and coordinate the structural features within the confines of the nest to properly seclude the occupant and to effectively deliver the eggs into the conveniently located receiver or depository.

Other features and advantages will become more readily apparent from the following description and accompanying drawings.

In the drawings, wherein like numerals are employed to designate like parts throughout the views.

Figure 1:
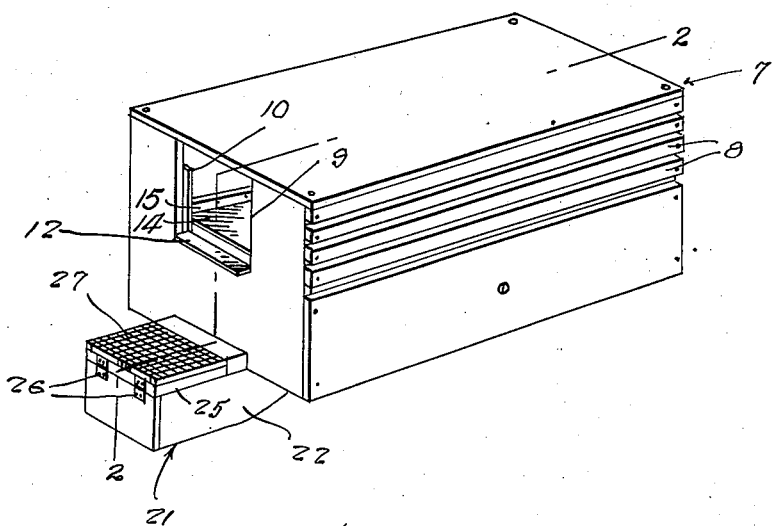
Figure 1 is a perspective drawing of a trap nest constructed in accordance with the principles and special purposes of the present invention.

Referring now to the drawings by properly duplicated distinguishing reference numerals, it will be observed that the box-like enclosure or housing is denoted by the numeral 7, this being of appropriate material and proportions to accommodate a single hen. It is open at the bottom and at least on one side is provided with a series of ventilating slats 8. These slats, the open bottom and an entrance opening 9 at the front, cooperate for proper air circulation and ventilation. This not only entices the entry of the hen, but promotes comfort while she is confined for laying purposes. Associated with the opening 9 are suitable vertical guides or cleats 10 to accommodate the slidable panel or board 11 which constitutes the gravity-lowered occupant-lifted door. This is slidable in the guides and provided with a stop flange 12 at the top and an inwardly and laterally projectible lifting and stop element 13 at its bottom. The element 13 engages with the under side of the inner step or tread plate 14 when the parts are in the relationship shown in Figure 2. Incidentally, the plate 14 is attached to endpieces or horizontal cleats 15 nailed or otherwise secured to the side walls of the box at a proper elevation in relation to the entrance opening 9.

Figure 2:
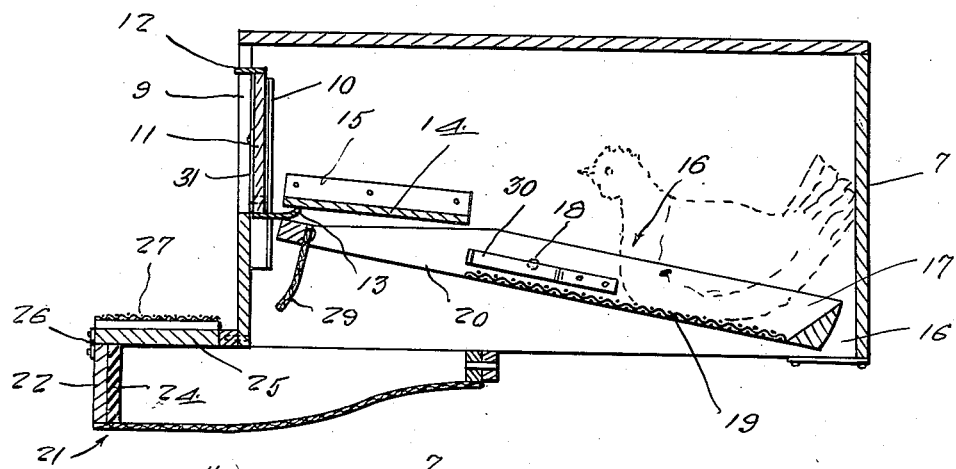
Figure 2 is a longitudinal sectional view taken centrally through the arrangement shown in perspective in Figure 1, the view being approximately on the plane of the line 2—2 of said Figure 1, showing the nest set and the trap door closed.
Figure 3:
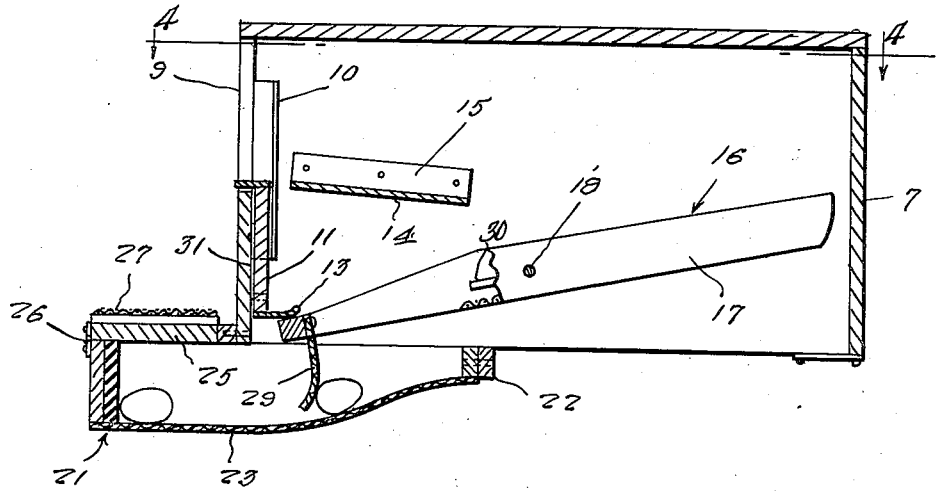
Figure 3 is a view like Figure 2, and therefore on the same section line, the nest being tilted down to egg dumping position and the trap door being shown dropped down to normal open position.
Figure 4:
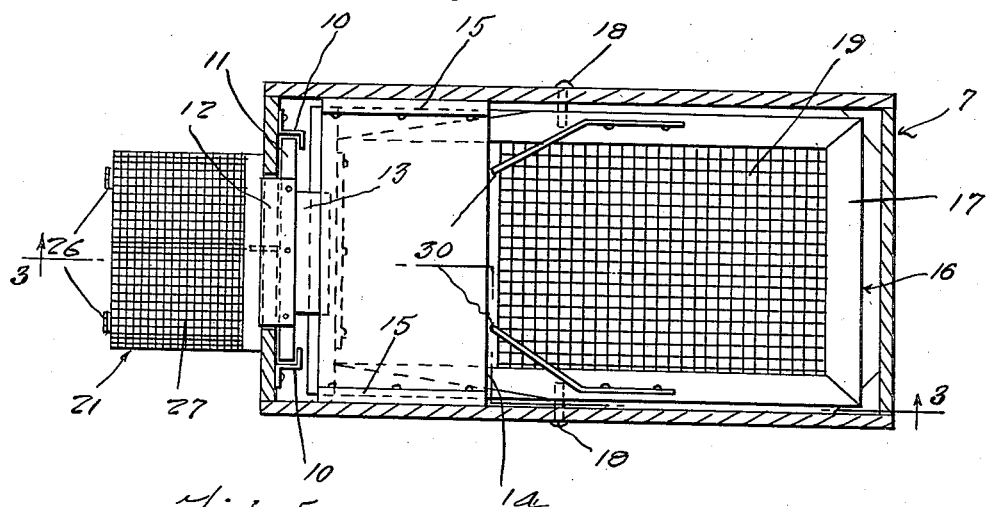
Figure 4 is a horizontal sectional view taken approximately on the plane of the line 4—4 of Figure 3.

Attention is now called to the numeral 16 which designates the tiltable or rockable nest unit. This is confined within the lower or bottom portion of the box or housing as shown in Figures 2 and 3. It is preferably in the nature of a horizontally elongated tray including a suitable frame 17 pivoted for swinging between its ends as indicated at the points 18. The frame carries a wire mesh or fabric bottom 19 which terminates in advance of the pivot to provide a discharge opening 20 which is registrable with the egg-trapping and retrieving receiver or depository 21. The part 21 is attached to the bottom adjacent the front of the box and extends outwardly beyond the box for convenience of handling and use. It comprises an appropriately proportioned and shaped frame 22 having a fabric bottom 23 to safely receive and retain the eggs. On the interior, at the front, is an egg checking buffer or bumper strip 24 to guard against breakage. The lid 25 is hingedly mounted as at 26 and serves not only as a closure for the depository, but as the external step. It is preferably provided with a suitable foot scraping mat 27, so that as the hen enters, she may, if so inclined, scrape dirt and mud from the feet, as is instinctively done. Incidentally, and as before indicated, this feature 27 is important in keeping the eggs clean by enabling the occupant to enter with clean feet.

Figure 5:
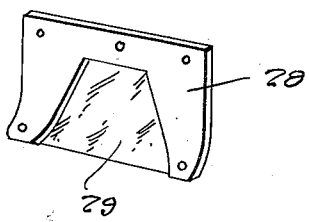
Figure 5 is a detail perspective view of an egg retarding and check flap element such as is mounted on the outer tiltable end of the nest unit.

Attention is invited at this time to the egg check element or unit detailed in Figure 5 of the drawings. This is in the nature of a depending flap and is composed of a rectangular metal plate 28 attached to the front cross-bar of the frame of the nest unit. It depends therefrom and is formed with a somewhat V-shaped notch. Attached to the plate 28 and stretched across the notch is a piece of cloth 29, utilized to gradually and safely check the downward roll of the egg to retard the egg, and to prevent it from rolling too rapidly against already trapped eggs in the depository 21. When the nest is occupied and is swung from the position depicted in Figure 3 to the position shown in Figure 2, and as the guard 29 is lifted, the egg then resting behind it is released and rolls slowly on into the frontal portion of the depository where it is accessible for removal. I also call attention to the numerals 30 which designate a pair of duplicate spring guides. These are secured to the intermediate portion of the nest unit. It is to be observed that the nest unit is as wide as the width of the box itself. Thus, the free end portions of the springs are bent into converging relationship to facilitate directing the egg into the depository 21 in an obvious manner. Incidentally, it may be observed that the free diverging ends of the guides coact with the free end portion of the screen 19. That is to say, they project within the vicinity of the discharge opening 20.

Under normal circumstances the parts are in the automatic set relationship shown in Figure 3. The hen enters through the doorway 9 while the door is lowered as is obvious. She steps on the inner step or tread plate and then into the nest. The weight of the hen causes the nest to tilt from the position shown in Figure 3 to the position shown in Figure 2. In so doing the forward or upwardly swingable end of the nest engages beneath and lifts the door 11 through the instrumentality of the lifting and stop element 13. Thus the hen finds herself trapped in the nest in a secluded state for unrestrained laying purposes. When the operation is complete, the hen upon leaving the nest, relieves the same of her weight and the weight of the door returns the nest to the tilted position shown in Figure 3 and at the same time literally dumps the egg into the chute where it can be retrieved by an attendant by way of the lid or door 25.

Figure 6:
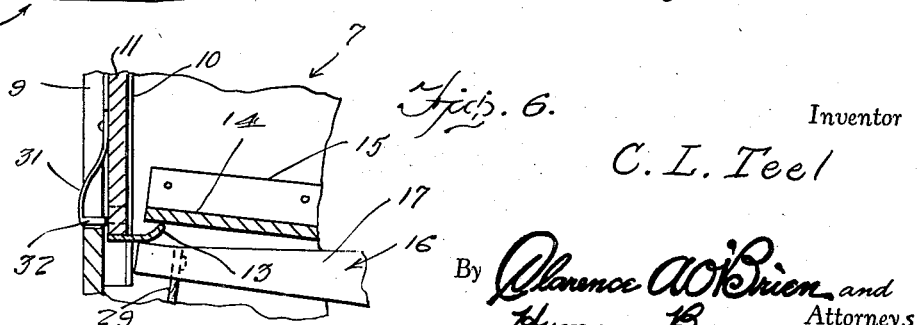
Figure 6 is a fragmentary view, partly in section and partly in elevation based on Figure 2 and showing how the spring latch on the sliding door is employed to lock said sliding door in its elevated or closed position.

It is evident that the structure is virtually automatic in operation. When, however, it is desired to retain the hen in the nest, the attendant may catch hold of the normally retracted spring latch 31 as shown in Figure 6 and engage the detent 32 with the lower edge of the entrance opening to keep the door temporarily closed. This is to enable the attendant to check up on the identity of the hen and mark the egg if so desired.

The structure is further characterized by simplicity and ease of operation, economy in construction and sale. It is substantially fool-proof, sanitary, properly ventilated, and facilitates prompt cooling of the egg. The eggs are clean thus saving time and labor in cleaning as is ordinarily required. The eggs can be gathered at any time without disturbing the hen on the nest, and when confined the hen is virtually secluded against frivolous annoyances by other fowls. It might be further added that the structure is so made as to render it substantially knock-down for cleaning and disinfecting purposes.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, an enclosure open at its bottom and provided at one end with an entrance opening, guides associated with said entrance opening, a gravity-lowered door mounting for sliding in said guides, means to restrict the downward descent of the door, means to restrict the upward movement thereof, and a tiltable nest unit in said enclosure including a frame, said frame being engageable with said last-named means in the manner and for the purposes described.

2. In a trap nest construction of the class described, an open bottom box provided at its front with an entrance opening, fixed guides associated with said opening, a gravity-lowered door slidable in said guides and cooperable with said opening, said door being provided at its top with an outstanding stop flange to limit the downward movement of the door, the door being provided on its interior and at its bottom with an inwardly projecting stop and lifting flange, a plate on the interior of said box associated with said entrance opening, said last-named flange being engageable with said plate as the door is lifted upwardly, and a tray pivotally mounted intermediate its ends on the interior of said box, the tray being engageable at one end with said lifting flange in the manner and for the purposes described.

3. In a structure of the class described, an open bottom box including a front wall provided with an entrance opening, guides mounted on the interior of said front wall on opposite sides of said entrance opening, a door slidably mounted in said guides, an egg collecting depository embodying a substantially narrow longitudinally elongated frame secured to the lower edge of the central portion of the front wall of the box and having one end extending beneath the open bottom of the box and the other end projecting beyond the front wall, a flexible bottom attached to said frame and cooperating therewith in providing a chute-forming receptacle, a tiltable nest unit pivotally mounted intermediate its ends in the open bottom portion of said box, said unit including a frame having a screen bottom, said screen bottom terminating in spaced relation from the forward discharge end of the nest unit and defining an egg discharge opening, said opening overlying the inner end portion of said depository, and a pair of spring guide fingers mounted in said nest unit and having converging flexible free end portions registering with said egg discharge opening and designed to facilitate directing the egg gently from the nest unit into the depository.

4. In a structural assemblage of the class described, in combination, a box open at its bottom and including a top, side walls and adjoining end walls, the front end wall being provided with an entrance opening, guide means on the interior of the box registerable with said opening, a closing door for said opening slidable in said guide, a shelf attached to the side walls inwardly of the entrance opening, said shelf forming a step, said door being provided with a stop element engageable with the under side of the step to limit the upward sliding movement of the door, a nest unit comprising a frame pivotally mounted intermediate its ends in the side walls, said frame being disposed in the lower portion of the box and having its forward end underlying the step, a screen bottom mounted in said frame, spring guide fingers mounted in the frame and cooperable with the screen bottom, a guard flap attached to the front cross-member of the frame and depending vertically therefrom, and an egg collecting receptacle mounted on the front end wall of the box and having its intake end located beneath the screen bottom of the nest unit in the manner and for the purposes described.

CLEMENT L. TEEL.